United States Patent
Mizutani (10) Patent No.: US 9,665,035 B2
(45) Date of Patent: May 30, 2017

(54) LIGHT SOURCE UNIT, LASER SCANNING UNIT, AND IMAGE FORMING APPARATUS

(71) Applicant: KYOCERA Document Solutions Inc., Osaka-shi, Osaka (JP)

(72) Inventor: Hideji Mizutani, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/249,217

(22) Filed: Aug. 26, 2016

(65) Prior Publication Data

US 2017/0060021 A1 Mar. 2, 2017

(30) Foreign Application Priority Data

Aug. 28, 2015 (JP) ................. 2015-169664

(51) Int. Cl.
| | | |
|---|---|---|
| G03G 15/00 | (2006.01) | |
| G02B 27/30 | (2006.01) | |
| H01S 3/04 | (2006.01) | |
| G03G 15/043 | (2006.01) | |
| H04N 1/028 | (2006.01) | |
| H04N 1/29 | (2006.01) | |
| H04N 1/06 | (2006.01) | |

(52) U.S. Cl.
CPC ......... *G03G 15/043* (2013.01); *H04N 1/0284* (2013.01); *H04N 1/02825* (2013.01); *H04N 1/06* (2013.01); *H04N 1/29* (2013.01); *H04N 2201/0094* (2013.01)

(58) Field of Classification Search
USPC ............ 399/1–4, 31, 32, 118, 201; 358/474; 359/198, 641; 369/44.17; 372/36, 109
See application file for complete search history.

(56) References Cited

U.S. PATENT DOCUMENTS

| | | | | |
|---|---|---|---|---|
| 5,490,158 A | * | 2/1996 | Mogi ....................... B41J 2/471 | 372/36 |
| 5,758,950 A | * | 6/1998 | Naoe .................... G02B 6/4204 | 362/259 |
| 6,928,100 B2 | * | 8/2005 | Sato ....................... G02B 7/025 | 359/718 |
| 7,123,553 B2 | * | 10/2006 | Mori ...................... G11B 7/123 | 369/44.14 |
| 7,940,440 B2 | * | 5/2011 | Nagaoka .................. B41J 2/471 | 359/198.1 |
| 8,724,187 B2 | * | 5/2014 | Mizutani ................ G02B 27/30 | 358/474 |

FOREIGN PATENT DOCUMENTS

JP 09218368 A 8/1997

* cited by examiner

*Primary Examiner* — Hoan Tran
(74) *Attorney, Agent, or Firm* — Alleman Hall Creasman & Tuttle LLP (57) ABSTRACT

This light source unit includes a light source, a collimator lens, a support body, and an adhesive agent. The collimator lens is configured to collimate laser light emitted from the light source. In the support body, a first support portion configured to support the light source and a second support portion configured to support the collimator lens are integrally molded with each other by use of a synthetic resin. The adhesive agent is attached by a larger amount between the second support portion and a second face which is on an opposite side to a first face on the light source side of the collimator lens, than between the second support portion and the first face.

9 Claims, 7 Drawing Sheets

LIGHT SOURCE UNIT, LASER SCANNING UNIT, AND IMAGE FORMING APPARATUS

INCORPORATION BY REFERENCE

This application is based upon and claims the benefit of priority from the corresponding Japanese Patent Application No. 2015-169664 filed on Aug. 28, 2015, the entire contents of which are incorporated herein by reference.

BACKGROUND

The present disclosure relates to a light source unit, a laser scanning unit, and an image forming apparatus.

An electrophotographic type image forming apparatus includes a laser scanning unit which forms an electrostatic latent image based on image data on an image carrier, by performing scanning with laser light. The laser scanning unit is provided with a light source unit which emits laser light. The light source unit includes: optical components such as a light source and a collimator lens; and a support body which is made of a synthetic resin and which supports the optical components.

SUMMARY

A light source unit according to one aspect of the present disclosure includes a light source, a collimator lens, a support body, and an adhesive agent. The collimator lens is configured to collimate laser light emitted from the light source. In the support body, a first support portion configured to support the light source and a second support portion configured to support the collimator lens are integrally molded with each other by use of a synthetic resin. The adhesive agent is attached by a larger amount between the second support portion and a second face which is on an opposite side to a first face on the light source side of the collimator lens, than between the second support portion and the first face.

A laser scanning unit according to another aspect of the present disclosure includes: the light source unit; and an optical scanning portion configured to perform scanning with laser light emitted from the light source unit.

An image forming apparatus according to another aspect of the present disclosure includes: the laser scanning unit; and an image forming unit including an image carrier on which an electrostatic latent image is formed by light emitted from the laser scanning unit.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the accompanying drawings. The embodiments described below represent an exemplary implementation of the present disclosure, and the technical scope of the present disclosure is not limited to the embodiments described below. In the description below, the directions of up, down, left, right, front, and rear defined in the accompanying drawings may be used.

[Schematic Configuration of Image Forming Apparatus 10]

First, a schematic configuration of the image forming apparatus 10 according to an embodiment of the present disclosure will be described.

Figure 1:
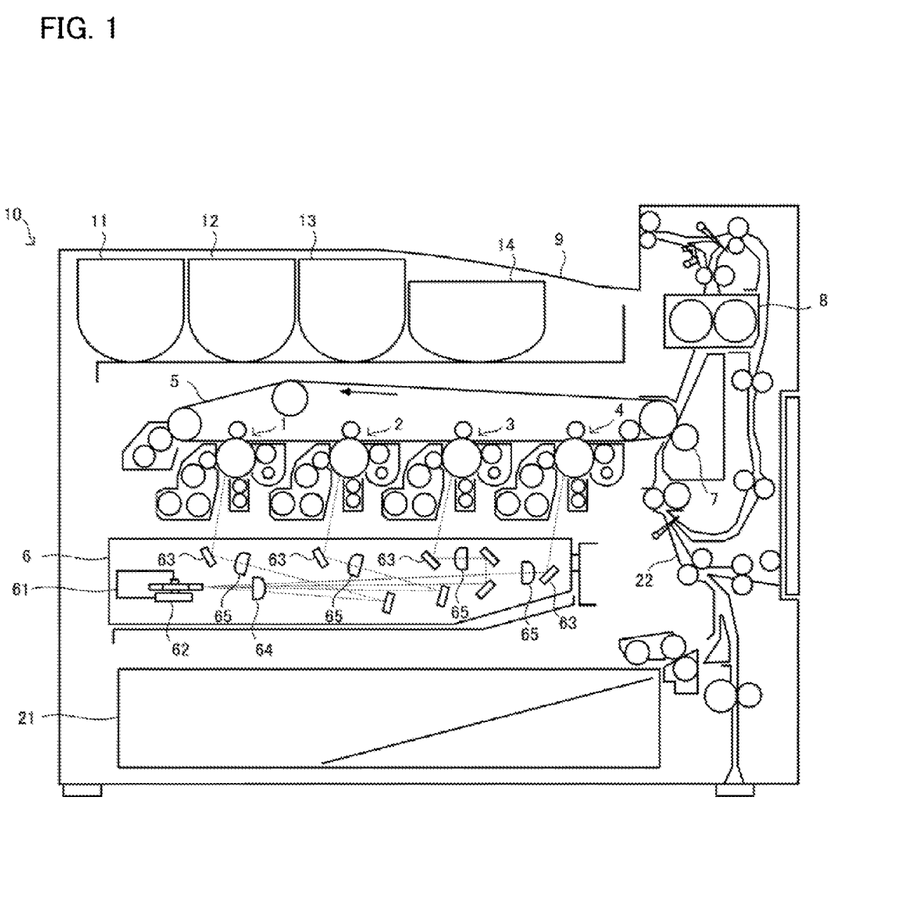
FIG. 1 is a configuration diagram of an image forming apparatus according to an embodiment of the present disclosure.

As shown in FIG. 1, the image forming apparatus 10 is a color printer that includes: a plurality of image forming units 1 to 4; an intermediate transfer belt 5, a laser scanning unit 6, a secondary transfer roller 7, a fixing device 8, a sheet discharge tray 9, a sheet feed cassette 21, a conveyance path 22, and the like. On the basis of inputted image data, the image forming apparatus 10 forms a monochrome image or a color image on a sheet such as paper. The image forming apparatus according to the present disclosure may be a facsimile apparatus, a copy machine, or a multifunction peripheral, for example.

The image forming units 1 to 4 are each an electrophotographic type image forming unit including a photosensitive drum (image carrier), a charging device, a developing device, a primary transfer roller, a cleaning device, and the like. The image forming units 1 to 4 are arranged side by side along the running direction of the intermediate transfer belt 5, and form a so-called tandem-type image forming portion. Specifically, a toner image corresponding to C (cyan) is formed in the image forming unit 1, a toner image corresponding to M (magenta) is formed in the image forming unit 2, a toner image corresponding to Y (yellow) is formed in the image forming unit 3, and a toner image corresponding to K (black) is formed in the image forming unit 4. The intermediate transfer belt 5 is an intermediate transfer member on which intermediate transfer of toner images of the respective colors formed on the photosensitive drums of the respective image forming units 1 to 4 is performed.

The laser scanning unit 6 includes a light source unit 61, a polygon mirror 62, reflection mirrors 63, a first scanning lens 64, second scanning lenses 65, and the like. The laser scanning unit 6 forms an electrostatic latent image on each of the photosensitive drums by irradiating the photosensitive drum of each of the image forming units 1 to 4 with laser light emitted from the light source unit 61, on the basis of inputted image data of each color.

The light source unit 61 emits laser light that corresponds to each of the image forming units 1 to 4. The polygon mirror 62 is an optical scanning portion which performs scanning along a predetermined scanning direction with each laser light emitted from the light source unit 61. Each laser light scanned at the polygon mirror 62 passes the first scanning lens 64 and the second scanning lens 65, to be guided to the reflection mirror 63. The first scanning lens 64 is used in common as a scanning lens for scanning a plurality of laser lights. Accordingly, reduction in the number of the first scanning lenses 64 and reduction in the thickness of the laser scanning unit 6 are realized. Each reflection mirror 63 reflects its corresponding laser light scanned at the polygon mirror 62, thereby applying the laser light to the photosensitive drum of the corresponding image forming unit 1 to 4. The focal length of laser light at the first scanning lens 64 and the second scanning lens 65 is 300 mm, using the first scanning lens 64 as the starting point, for example.

In the image forming apparatus 10 configured as above, a color image is formed in the following procedure on a sheet supplied from the sheet feed cassette 21 along the conveyance path 22, and then, the sheet having an image formed thereon is discharged into the sheet discharge tray 9. The conveyance path 22 is provided with various types of conveying rollers which convey the sheet, which have been placed in the sheet feed cassette 21, through the secondary transfer roller 7 and the fixing device 8 into the sheet discharge tray 9.

First, in each of the image forming units 1 to 4, the photosensitive drum is uniformly charged to a predetermined potential by the charging device. Next, an electrostatic latent image is formed on the surface of each of the photosensitive drums by the laser scanning unit 6 scanning the surface of each of the photosensitive drums with laser light based on the image data. The electrostatic latent image on each of the photosensitive drums is developed (visualized) as a toner image in its corresponding color by its corresponding developing device. To each of the developing devices, toner (developer) is supplied from a detachable toner container 11 to 14 corresponding to each color.

Subsequently, the toner images in each color formed on the photosensitive drum of each of the image forming units 1 to 4 is overlaid and transferred onto the intermediate transfer belt 5 by each of the primary transfer rollers. With this, a color image based on the image data is formed on the intermediate transfer belt 5. Next, the color image on the intermediate transfer belt 5 is transferred onto the sheet conveyed by the secondary transfer roller 7 from the sheet feed cassette 21 via the conveyance path 22. Then, the color image transferred on the sheet is heated by the fixing device 8, to be fused and fixed on the sheet. Toner remaining on the surface of each of the photosensitive drums is removed by each of the cleaning devices.

[Configuration of Light Source Unit 61]

Figure 2:
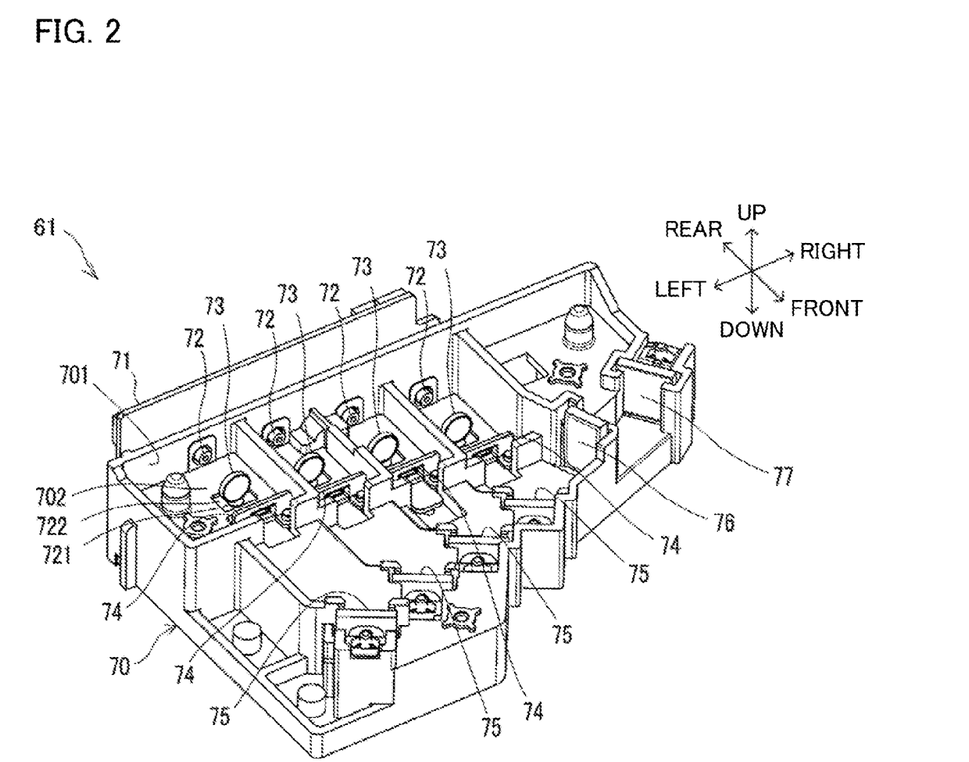
FIG. 2 is a perspective view of a light source unit according to the embodiment of the present disclosure.

Next, with reference to FIG. 2 to FIG. 4, details of the light source unit 61 mounted on the laser scanning unit 6 will be described. FIG. 2 is a perspective view of the light source unit 61, FIG. 3 is a plan view of the light source unit 61, and FIG. 4 is a cross-sectional view of the light source unit 61.

Figure 3:
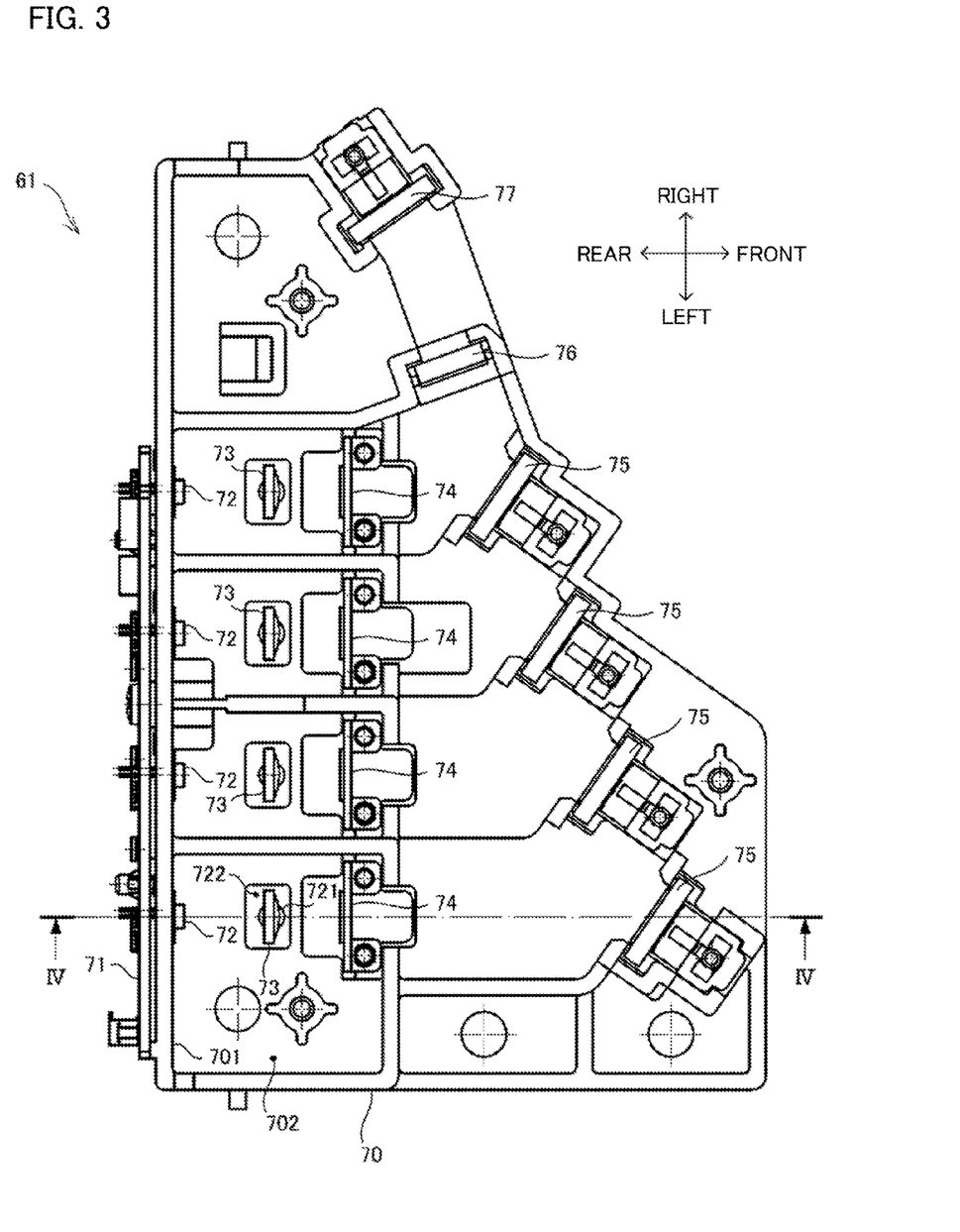
FIG. 3 is a plan view of the light source unit according to the embodiment of the present disclosure.
Figure 4:
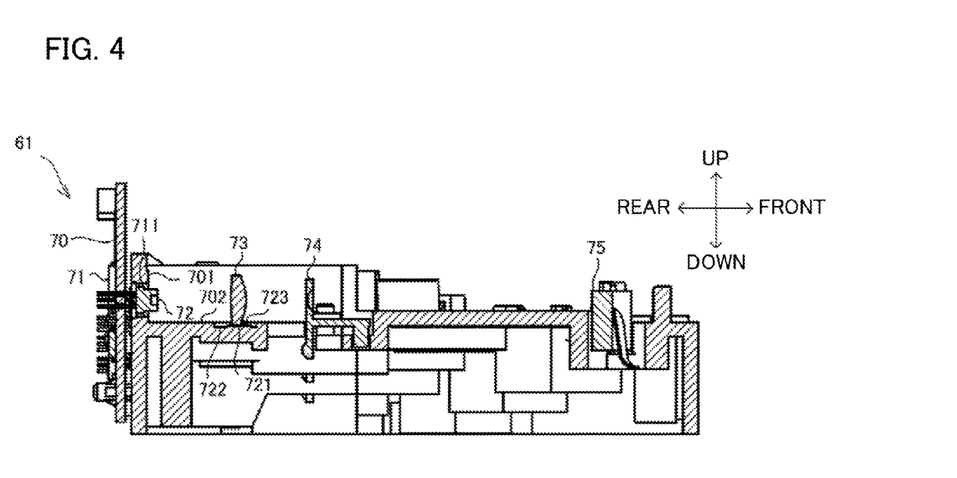
FIG. 4 is a cross-sectional view of the light source unit taken along the line IV-IV shown in FIG. 3.

First, as shown in FIG. 2 to FIG. 4, the light source unit 61 includes a support body 70, a substrate 71, light sources 72, collimator lenses 73, apertures 74, reflection mirrors 75, a cylindrical lens 76, a reflection mirror 77, and the like. The light source 72, the collimator lens 73, the aperture 74, and the reflection mirror 75 are provided, corresponding to each of the photosensitive drums.

The support body 70 is an integrally molded member made of a synthetic resin. For example, the support body 70 may be an integrally molded member which is made of a synthetic resin in which polycarbonate (PC) and polystyrene (PS) are mixed. In particular, the support body 70 includes a first support portion 701 and a second support portion 702 which are integrally molded with each other by use of a synthetic resin.

The first support portion 701 is a wall portion which supports the light sources 72. The second support portion 702 is a setting portion which supports the collimator lenses 73. Each light source 72 is press-fitted and fixed in a through-hole 711 (see FIG. 4) formed in the second support portion 702. Each collimator lens 73 is bonded to be fixed to the second support portion 702 with an adhesive agent 723 (see FIG. 4). Details of the structure for fixing the collimator lens 73 will be described later.

Each light source 72 is a semiconductor laser element which emits laser light, and is mounted on the substrate 71. Specifically, the light source 72 is press-fitted into the through-hole 711 of the first support portion 701, and then, the terminal of the light source 72 is fixed to the substrate 71 by soldering, or the like. The light source 72 is a single-beam light source which emits one laser beam, or a monolithic multi-beam light source capable of emitting a plurality of laser beams. Each collimator lens 73 collimates the laser light emitted from its corresponding light source 72. Each aperture 74 limits the width of the light path of the laser light that has passed through its corresponding collimator lens 73.

Each reflection mirror 75 reflects the laser light emitted from its corresponding light source 72 toward the cylindrical lens 76. The cylindrical lens 76 causes each laser light to converge into a line image on the reflection surface (deflection surface) of the polygon mirror 62. The reflection mirror 77 reflects each laser light having passed through the cylindrical lens 76, thereby applying the laser light to the polygon mirror 62.

There are cases where the support body 70 molded with a synthetic resin shrinks and deforms over time. For example, the support body 70 may shrink and deform over time due to release of residual stress caused at molding of the support body 70. In addition, the temperature in the image forming apparatus 10 tends to be high due to heat generated at the substrate 71, a drive motor of the polygon mirror 62, a heater of the fixing device 8, and the like. Thus, due to continuous use in such a high temperature environment, the support body 70 may shrink and deform over time.

Then, when the support body 70 shrinks and deforms in the image forming apparatus 10, the distance between the collimator lens 73 and the light source 72 supported by the support body 70 changes, and the focus position of the laser light on the surface of the photosensitive drum may change. Such a change in the focus position of laser light could cause deterioration of image quality.

In contrast, in the light source unit 61 and the image forming apparatus 10, each collimator lens 73 is fixed by a fixing structure described later. Thus, variation in the distance between the collimator lens 73 and the light source 72 supported by the support body 70 molded with a synthetic resin can be suppressed from occurring.

[Fixing Structure for Collimator Lens 73]

Figure 5:
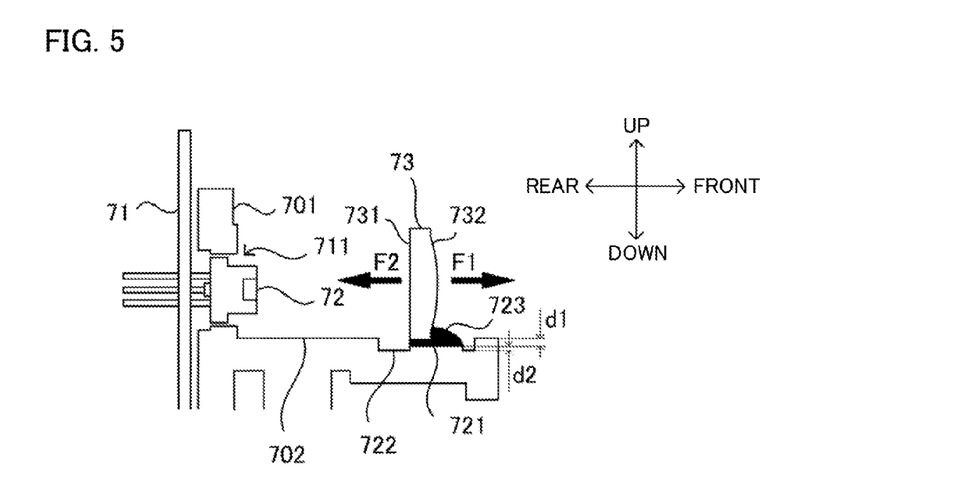
FIG. 5 is a schematic diagram of a main part of the light source unit according to the embodiment of the present disclosure.

FIG. 5 is an enlarged view of a main part of the light source unit 61 for describing the fixing structure for fixing the collimator lens 73 in the light source unit 61. In the following, the fixing structure for one collimator lens 73 mounted on the light source unit 61 will be described. However, the other three collimator lenses 73 are each mounted by the same fixing structure.

As shown in FIG. 5, in the light source unit 61, the light source 72 is fixed to the first support portion 701 by being press-fitted in the through-hole 711 in the first support portion 701. In the second support portion 702 integrally molded with the first support portion 701, a seat 721 and a recessed portion 722 are formed. The collimator lens 73 is disposed at the seat 721 and bonded to be fixed to the seat 721 with an adhesive agent 723.

The seat 721 has a circular, elliptical, or rectangular shape in a plan view, for example. The recessed portion 722 is formed around the seat 721, and has a doughnut shape or a rectangular shape without its center portion, in a plan view, for example. In the optical axis direction of the light source 72, the dimension of the seat 721 is larger than the dimension in the same direction of the collimator lens 73. In the direction perpendicular to the optical axis direction, the dimension of the seat 721 is smaller than the dimension in the same direction of the collimator lens 73.

In the light source unit 61, a step having a dimension d1 is provided between the upper surface of the second support portion 702 and the upper surface of the seat 721. Further, in the light source unit 61, a step having a dimension d2 is provided between the upper surface of the seat 721 and the upper surface of the recessed portion 722. Thus, in the second support portion 702, the seat 721 protrudes relative to the surrounding portion, and thus, the surface tension suppresses deformation of the adhesive agent 723 into directions toward the surrounding portion, the adhesive agent 723 having been applied to the seat 721 but not having been cured.

In a case where the recessed portion 722 is provided in the second support portion 702, the step between the upper surface of the second support portion 702 and the upper surface of the seat 721 may be omitted. Alternatively, the recessed portion 722 may be omitted in the second support portion 702, and the seat 721 may be formed so as to protrude upward from the upper surface of the second support portion 702.

The adhesive agent 723 is an ultraviolet curable resin that is cured by being irradiated with ultraviolet light. For example, the adhesive agent 723 is an acrylic resin acrylate, a urethane acrylate, an epoxy acrylate, or the like. The adhesive agent 723 is cured from its outer periphery by being irradiated with ultraviolet light, and in the adhesive agent 723, residual stress will remain which could cause post-cure shrinkage deformation thereof over time. It is preferable to shorten the irradiation time period of ultraviolet light in order to improve production efficiency, in particular, but in such a case, the adhesive agent 723 will be cured from the surface and tends to leave the inside thereof uncured. Thus, residual stress tends to remain in the adhesive agent 723.

The adhesive agent 723 is one example of light-curable resins, and may be an adhesive agent of a type which is cured by being irradiated with light having another wavelength other than ultraviolet light. Alternatively, as long as the adhesive agent 723 is of a kind which will shrink and deform by the residual stress after the curing, the adhesive agent 723 may be another adhesive agent which will be cured by reacting with moisture, for example.

In the light source unit 61, the adhesive agent 723 is attached between the lower surface of the collimator lens 73 and the seat 721 of the second support portion 702. Here, between the lower surface of the collimator lens 73 and the seat 721 of the second support portion 702, a gap having a preset specific dimension is formed, and the adhesive agent 723 is filled in the gap.

In addition, in the light source unit 61, the adhesive agent 723 is also attached between the seat 721 of the second support portion 702 and a second face 732 which is on the opposite side to a first face 731, which is on the light source 72 side, of the collimator lens 73. Meanwhile, in the light source unit 61, the adhesive agent 723 is not attached between the first face 731 of the collimator lens 73 and the seat 721 of the second support portion 702. That is, in the light source unit 61, the adhesive agent 723 is attached by a larger amount between the second support portion 702 and the second face 732 which is on the opposite side to the first face 731, than between the second support portion 702 and the first face 731 on the light source 72 side of the collimator lens 73.

Accordingly, in the adhesive agent 723, residual stress occurs which could cause shrinkage deformation of the adhesive agent 723 over time. Thus, the collimator lens 73 moves over time in a direction F1 along which the collimator lens 73 is distanced away from the light source 72 due to shrinkage deformation caused by release of the residual stress in the adhesive agent 723. That is, the adhesive agent 723 displaces the collimator lens 73 in the direction F1 along which the distance between the light source 72 and the collimator lens 73 is increased.

Meanwhile, as described above, in the light source unit 61, the support body 70 is molded with a synthetic resin, and thus, in the support body 70, residual stress which could cause shrinkage deformation thereof over time occurs. Therefore, the collimator lens 73 moves over time in a direction F2 along which the collimator lens 73 approaches the light source 72 due to shrinkage deformation caused by release of the residual stress in the support body 70. That is, the support body 70 displaces the collimator lens 73 in the direction F2 along which the distance between the light source 72 and the collimator lens 73 is decreased.

In this manner, in the light source unit 61, the displacement in the direction F1 of the collimator lens 73 due to shrinkage deformation of the adhesive agent 723 cancels the displacement in the direction F2 of the collimator lens 73 due to shrinkage deformation of the support body 70. Thus, change in the distance between the collimator lens 73 and the light source 72 supported by the support body 70 made of a synthetic resin can be suppressed. Accordingly, in the image forming apparatus 10, change in the focus position of laser light emitted onto the surface of the photosensitive drum from the laser scanning unit 6 is suppressed, and deterioration of the image quality over time is suppressed.

In the light source unit 61, the adhesive agent 723 may be attached between the second support portion 702 and the first face 731 of the collimator lens 73. However, in such a case, in order to make the displacement amount in the direction F1 of the collimator lens 73 balanced with the displacement amount in the direction F2 of the collimator lens 73, the adhesive agent 723 needs to be attached by a larger amount between the second support portion 702 and the second face 732 of the collimator lens 73, than between the second support portion 702 and the first face 731 of the collimator lens 73. That is, it is sufficient that, in the light source unit 61, the adhesive agent 723 is applied such that the displacement amount of the collimator lens 73 in the direction F1 due to shrinkage deformation of the adhesive agent 723 is equivalent to the displacement amount in the direction F2 of the collimator lens 73 due to shrinkage deformation of the support body 70.

Meanwhile, when the specific dimension of the gap formed between the lower surface of the collimator lens 73 and the seat 721 of the second support portion 702 is large, the thickness of the layer of the adhesive agent 723 is increased, and thus, the amount of shrinkage deformation of the adhesive agent 723 is increased. The collimator lens 73 is displaced according to the amount of the deformation of the adhesive agent 723. Thus, it is preferable that the specific dimension is appropriately set in advance such that the shrinkage deformation of the support body 70 of the light source unit 61 can be canceled.

For example, in the light source unit 61 formed by molding with a resin, there are cases where the position on the photosensitive drum of laser light emitted from the light source 72 is shifted by about ±0.08 mm. However, in the light source unit 61, the light source 72 is fixed to the first support portion 701 of the support body 70. Thus, there are cases where the installation height of the collimator lens 73 is shifted when the optical axis thereof is adjusted. Here, if the thickness of the collimator lens 73 is not greater than 4 mm, and the adhesive agent 723 has a viscosity that could allow application thereof by means of an air cylinder, it is empirically known that the amount of shrinkage deformation of the adhesive agent 723 is stabilized to a known value if the specific dimension is 0.2 mm. Therefore, it is preferable that the specific dimension is close to 0.2 mm. For example, it is known that, if the specific dimension is about 0.2 mm±0.02 mm (i.e., 0.18 mm to 0.22 mm), change in the amount of shrinkage deformation of the adhesive agent 723 is small. On the other hand, between a moving amount ox of the collimator lens 73 and a moving amount ΔX on the polygon mirror 62 of laser light, there is a relationship expressed by the following formula (1). Here, the focal length of the collimator lens 73 is expressed as fco, and the focal length of the cylindrical lens 76 is expressed as fcy.

[Math 1]

$$\sigma x = \frac{fco}{fcy} \cdot \Delta X \quad (1)$$

Therefore, according to formula (1) above, the ratio (fco/fcy) between the focal length fco of the collimator lens 73 and the focal length fcy of the cylindrical lens 76 is the moving amount ox of the collimator lens 73/the moving amount ΔX on the polygon mirror 62 of laser light. For example, in the laser scanning unit 6, the focal length fco of the collimator lens 73 is 15 mm, and the focal length fcy of the cylindrical lens 76 is 135 mm. Thus, if the ratio of the focal length fco of the collimator lens 73 relative to the focal length fcy of the cylindrical lens 76 in the laser scanning unit 6 is set to ¼ or less, the moving amount of the collimator lens 73 at the time of adjustment of the optical axis can be made within the range of ±0.02 mm.

[Method for Manufacturing Light Source Unit 61]

Next, with reference to FIG. 6 to FIG. 9, one example of a method for manufacturing the light source unit 61 will be described. In the description below, S1, S2, . . . respectively represent identification signs of assembling steps of the light source unit 61. The assembling steps of the light source unit 61 are steps of assembling components to the support body 70. The method for manufacturing the light source unit 61 described here includes steps to be executed in accordance with the flow chart shown in FIG. 6, but may include another step.

<Step S1>

Figure 6:
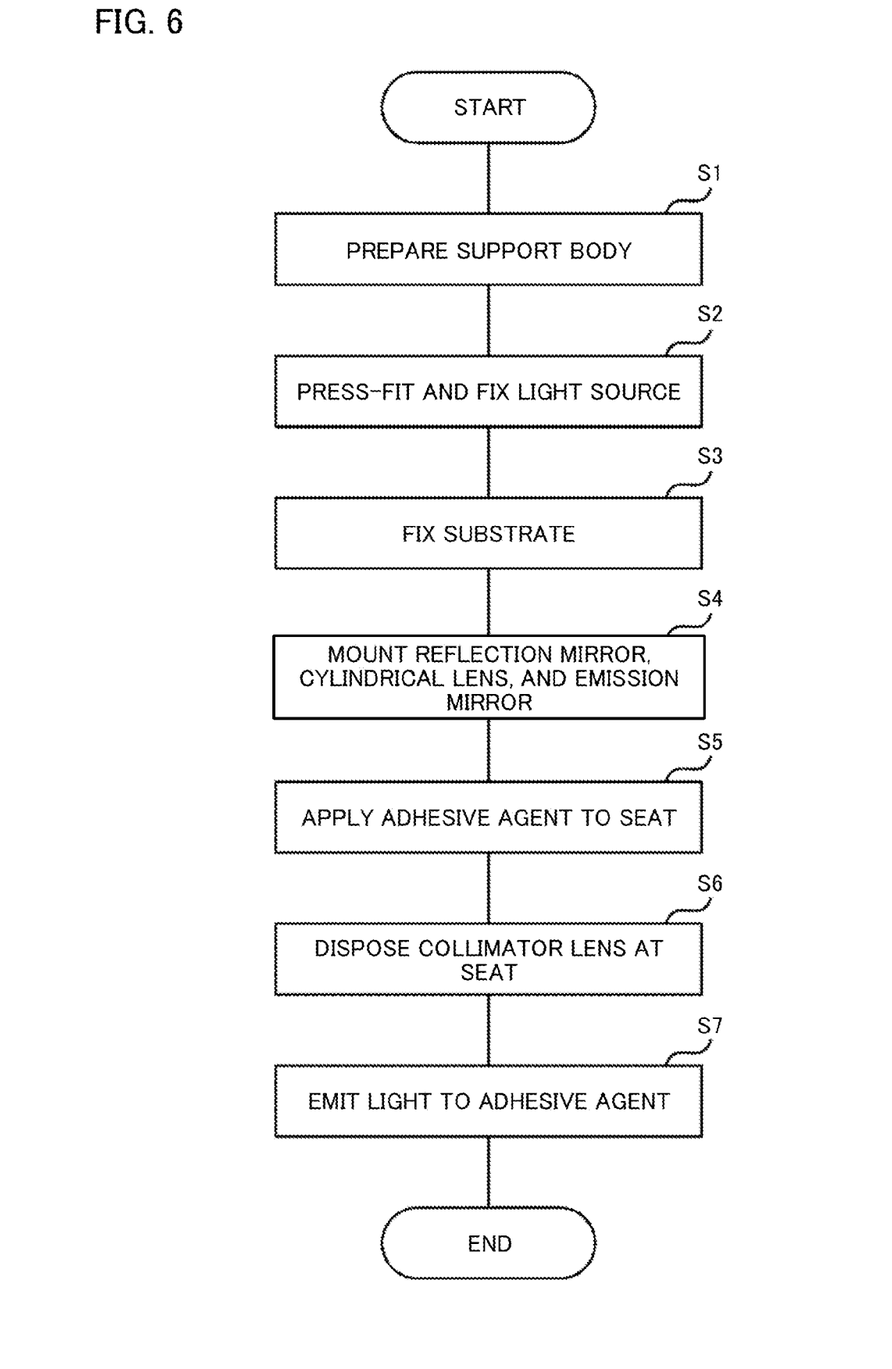
FIG. 6 is a flow chart for describing manufacturing steps of the light source unit according to the embodiment of the present disclosure.

First, in step S1, the support body 70 formed with a mold is prepared. As described above, the first support portion 701, the second support portion 702, the seat 721, the recessed portion 722, and the like are integrally formed in the support body 70.

<Step S2>

Next, in step S2, each light source 72 is press-fitted into its corresponding through-hole 711 of the first support portion 701 of the support body 70, thereby being fixed to the first support portion 701.

<Step S3>

Figure 7:
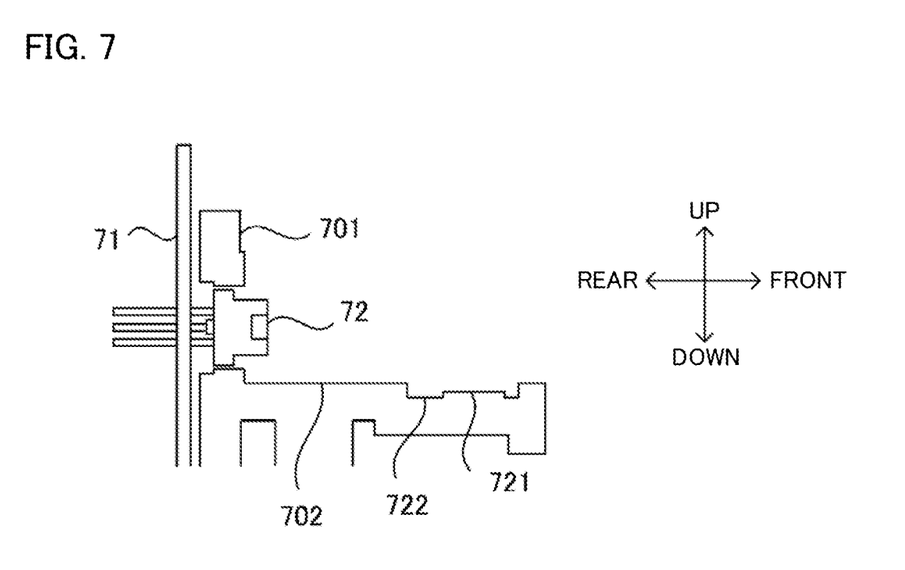
FIG. 7 is a schematic diagram of a main part of the light source unit according to the embodiment of the present disclosure.

Subsequently, in step S3, the substrate 71 is mounted to the first support portion 701 of the support body 70. The substrate 71 is fixed to the first support portion 701 through thread-engagement using screws, for example. At this time, the terminal of the light source 72 is connected to a wiring pattern of the substrate 71 by soldering or the like. FIG. 7 shows a main part of the support body 70, in a state where the substrate 71 and the light source 72 have been fixed to the first support portion 701 as a result of steps S1 to S3.

<Step S4>

In step S4, optical components such as the reflection mirrors 75, the cylindrical lens 76, and the reflection mirror 77 are mounted at predetermined orientations to the support body 70.

<Step S5>

Figure 8:
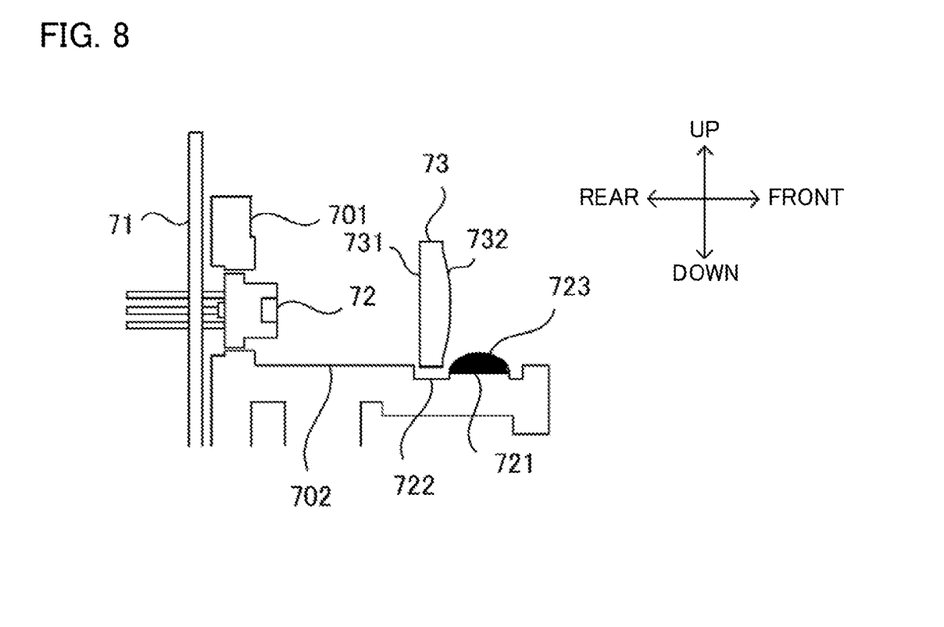
FIG. 8 is a schematic diagram of a main part of the light source unit according to the embodiment of the present disclosure.

In step S5, the adhesive agent 723 is applied by a predetermined amount to the seat 721 of the second support portion 702 of the support body 70. At this time, the adhesive agent 723 is applied to the seat 721 such that the upper end of the adhesive agent 723 is located at least above the gap having the specific dimension that should be secured between the lower surface of the collimator lens 73 and the upper surface of the seat 721. The application of the adhesive agent 723 is performed by using a dispenser not shown or the like that has an air cylinder, for example. FIG. 8 shows a state where the adhesive agent 723 has been applied to the seat 721 of the second support portion 702 of the support body 70. At this time, the adhesive agent 723 is not in contact with the collimator lens 73.

<Step S6>

Next, in step S6, the collimator lens 73 is disposed at the seat 721.

Specifically, first, the collimator lens 73, being held by a drive portion of a robot arm not shown or the like, is moved to a position which is between the light source 72 and the seat 721, and at which the gap having the specific dimension is formed between the lower surface of the collimator lens 73 and the upper surface of the seat 721. The drive portion, which is driven by an operation performed by a user or by automatic operation, holds the collimator lens 73 and moves the collimator lens 73.

Figure 9:
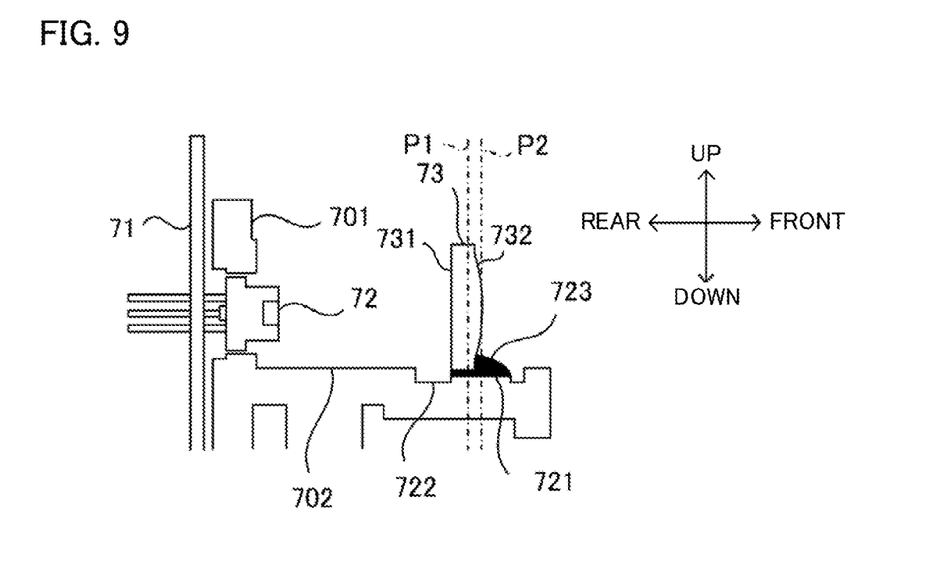
FIG. 9 is a schematic diagram of a main part of the light source unit according to the embodiment of the present disclosure.

Then, the collimator lens 73 is moved by the drive portion toward the seat 721 from the position between the light source 72 and the seat 721. That is, the collimator lens 73 is moved along the advancing direction of laser light emitted from the light source 72. At this time, the collimator lens 73 is moved while being in contact with the adhesive agent 723 of the seat 721 and pushing away the adhesive agent 723. This causes the adhesive agent 723 to be attached to the second face 732 side of the collimator lens 73. FIG. 9 shows a state where the collimator lens 73 has been disposed at the seat 721 as a result of step S6.

As shown in FIG. 9, in step S6, arrangement of the collimator lens 73 is adjusted such that a center P1 of the dimension of the collimator lens 73 in the advancing direction of laser light from the light source 72 is present on the light source 72 side relative to a center P2 of the dimension of the seat 721 in the advancing direction. This suppresses an excessive amount of the adhesive agent 723 from being attached to the first face 731 of the collimator lens 73. Accordingly, a relationship is easily realized in which the amount of the adhesive agent 723 to be attached to the second face 732 is larger than the amount of the adhesive agent 723 to be attached to the first face 731.

<Step S7>

Then, in step S7, the adhesive agent 723 is irradiated by ultraviolet light, whereby the adhesive agent 723 is cured, and the collimator lens 73 is bonded to be fixed to the second face 732.

As also shown in FIG. 9, in the light source unit 61, the collimator lens 73 is disposed in a state where, in the advancing direction, the first face 731 of the collimator lens 73 is aligned with the end surface on the light source 72 side of the seat 721. A configuration may be employed in which, in a plan view, the collimator lens 73 is within the seat 721 and the adhesive agent 723 is attached to the entirety of the lower surface of the collimator lens 73.

Further, in the present embodiment, the color-type image forming apparatus 10 provided with a plurality of the image forming units 1 to 4 has been described as an example. However, the image forming apparatus according to the present disclosure can be applied also to a monochrome-type image forming apparatus provided with one image forming unit.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A light source unit comprising:
   a light source;
   a collimator lens configured to collimate laser light emitted from the light source;
   a support body in which a first support portion configured to support the light source and a second support portion configured to support the collimator lens are integrally molded with each other by use of a synthetic resin; and
   an adhesive agent which is attached by a larger amount between the second support portion and a second face which is on an opposite side to a first face on the light source side of the collimator lens, than between the second support portion and the first face.

2. The light source unit according to claim 1, wherein the second support portion includes a seat at which the collimator lens is disposed and a recessed portion formed around the seat, and
   the adhesive agent is attached between the second face and the seat of the second support portion.

3. The light source unit according to claim 1, wherein the adhesive agent is not attached between the first face and the second support portion.

4. The light source unit according to claim 1, wherein the adhesive agent is attached between a lower surface of the collimator lens and the second support portion.

5. The light source unit according to claim 4, wherein the adhesive agent is filled in a gap which has a preset dimension and which is formed between the lower surface and the second support portion.

6. The light source unit according to claim 1, wherein the support body is a molded member made of a synthetic resin in which polycarbonate and polystyrene are mixed.

7. The light source unit according to claim 1, wherein the adhesive agent is a light-curable resin which is cured by being irradiated with light.

8. A laser scanning unit comprising:
   the light source unit according to claim 1; and
   an optical scanning portion configured to perform scanning with laser light emitted from the light source unit.

9. An image forming apparatus comprising:
   the laser scanning unit according to claim 8; and
   an image forming unit including an image carrier on which an electrostatic latent image is formed by light emitted from the laser scanning unit.

* * * * *